UNITED STATES PATENT OFFICE.

ADOLPH THODE, OF BROOKLYN, NEW YORK.

IMPROVEMENT IN WASHING-FLUIDS.

Specification forming part of Letters Patent No. 166,948, dated August 24, 1875; application filed April 5, 1875.

*To all whom it may concern:*

Be it known that I, ADOLPH THODE, of Brooklyn, Kings county, State of New York, have invented a new and Improved Washing-Fluid, of which the following is a specification:

The nature of my invention consists in the combination of concentrated potash, concentrated chloride of sodium, borax, and soapwort with a certain quantity of water. This fluid is then ready for use, or the same may be flavored with any desired essence.

To prepare the fluid, I take one gallon of water, four ounces of concentrated potash, one ounce of borax, two ounces of soapwort, and one-quarter of a pint of chloride of sodium. The potash, borax, and soapwort are first dissolved in parts of the gallon of water, and all boiled in separate vessels for a short time, and then mixed together and the chloride of soda added to the mass, which, when cold, is ready for use.

This fluid may be flavored with any desired essence.

To use this washing-fluid, the clothing is, with the addition of very little soap, placed into a wash-kettle, and for every bucketful of water put into the kettle one-half pint of this fluid is added, and the clothing then allowed to boil for about half an hour, after which the clothing can be washed out in cold water, and will be found perfectly clean.

I claim—

A washing-fluid consisting of potash, borax, chloride of sodium, soapwort, and water, in about the proportions specified.

ADOLPH THODE.

Witnesses:
HENRY E. ROEDER,
E. SCHULER.